United States Patent
Kepplinger et al.

[11] Patent Number: 5,948,139
[45] Date of Patent: Sep. 7, 1999

[54] PROCESS FOR THE PRODUCTION OF MOLTEN PIG IRON OR STEEL PRE-PRODUCTS AND A PLANT FOR CARRYING OUT THE PROCESS

[75] Inventors: Werner Leopold Kepplinger, Leonding; Felix Wallner; Johannes Schenk, both of Linz, all of Austria

[73] Assignees: Voest-Alpine Industrieanlagenbau GmbH, Linz, Austria; Pohang Iron & Steel Co., Ltd.; Research Institute of Industrial Science & Technology Incorporated Foundation, both of Pohang, Rep. of Korea

[21] Appl. No.: 08/793,875
[22] PCT Filed: Jul. 18, 1996
[86] PCT No.: PCT/AT96/00129
  § 371 Date: Apr. 17, 1997
  § 102(e) Date: Apr. 17, 1997
[87] PCT Pub. No.: WO97/04137
  PCT Pub. Date: Feb. 6, 1997

[30] Foreign Application Priority Data

Jul. 19, 1995 [AT] Austria ..................................... 1235/95

[51] Int. Cl.$^6$ .................................................. C21B 13/00
[52] U.S. Cl. ............................. 75/443; 75/445; 266/172; 266/182
[58] Field of Search .............................. 75/443, 445, 446, 75/453, 492, 499, 500; 266/160, 172, 182

[56] References Cited

U.S. PATENT DOCUMENTS

| | | |
|---|---|---|
| 3,002,736 | 10/1961 | Travis . |
| 3,264,096 | 8/1966 | Agarwal et al. . |
| 3,607,224 | 9/1971 | Blaskowski . |
| 4,699,655 | 10/1987 | Milionis ..................................... 75/492 |
| 5,082,251 | 1/1992 | Whipp . |
| 5,445,668 | 8/1995 | Kepplinger et al. ..................... 75/491 |
| 5,464,464 | 11/1995 | Edelson ..................................... 75/443 |

FOREIGN PATENT DOCUMENTS

| | | |
|---|---|---|
| 0010627 | 5/1980 | European Pat. Off. . |
| 0111176 | 6/1984 | European Pat. Off. . |
| 0174291 | 3/1986 | European Pat. Off. . |
| 0217331 | 4/1987 | European Pat. Off. . |
| 0481955 | 4/1992 | European Pat. Off. . |
| 0576414 | 12/1993 | European Pat. Off. . |
| 1257877 | 7/1961 | France . |
| 1154817 | 9/1963 | Germany . |
| 1267692 | 5/1968 | Germany . |
| 2660884 | 4/1985 | Germany . |

*Primary Examiner*—Melvyn Andrews
*Attorney, Agent, or Firm*—Ostrolenk, Faber, Gerb & Soffen, LLP

[57] ABSTRACT

In a process for the production of molten pig iron or steel pre-products from fine-particulate iron-cintaining material, in a meltdown-gasifying zone of a melter gasifier (1), under the supply of carbon-containing material and oxygen-containing gas at the simultaneous formation of a reducing gas, in a bed formed of sold carbon carriers, the iron-containing material is melted when passing the bed. To be able to employ a charge here up to 100% of which consist of fine ore, while reliably avoiding discharge of the supplied fine ore, a high-temperature combustion and/or gasification xzone is formed by combusting and/or gasifying carbon-containing material under direct supply of oxygen in a killing space (III) formed above the bed, into which high-temperature combustion and/or gasification zone the fine-particulate iron-containing material is directly introduced, wherein at least incipient surface melting of the iron-containing material and agglomeration of the same are carried out by means of the heat released during the reaction of the carbon-containing material.

29 Claims, 4 Drawing Sheets

PROCESS FOR THE PRODUCTION OF MOLTEN PIG IRON OR STEEL PRE-PRODUCTS AND A PLANT FOR CARRYING OUT THE PROCESS

The invention relates to a process for the production of molten pig iron or steel pre-products from fine-particulate iron-containing material, in particular reduced sponge iron, in a meltdown-gasifying zone of a melter gasifier, in which, under the supply of carbon-containing material and oxygen-containing gas at the simultaneous formation of a reducing gas, in a bed formed of solid carbon carriers, the iron-containing material is melted when passing the bed, optionally upon previous complete reduction, and a plant for carrying out the process.

EP-B-0 010 627 teaches a process for the production of molten pig iron or steel pre-products from particulate iron-containing material, particularly prereduced sponge iron, and for the production of reducing gas in a melter gasifier, wherein by the addition of coal and by blowing in an oxygen-containing gas a fluidized bed is formed of coke particles. Here, the oxygen-containing gas or pure oxygen respectively are injected into the lower region of the melter gasifier. The particulate iron-containing material, particularly prereduced sponge iron, and the lumpy coal are fed in from above, through charging openings arranged in the hood of the melter gasifier, the descending particles are slowed down in the fluidized bed and the iron-containing particles are reduced and melted while falling through the coke fluidized bed. The molten and slag-covered metal collects at the bottom of the melter gasifier. Metal and slag are drawn off through separate tap openings.

A process of this kind is, however, not suited for processing fine-particle sponge iron, as fine-particle sponge iron would be discharged from melter gasifier at once, due to the pronounced gas flow existing within the same. Discharging is further promoted by the temperature reigning in the upper region of the melter gasifier, since it is too low to ensure melting of the sponge iron at the charging site.

From U.S. application Ser. No. 5,082,251 it is known to directly reduce iron-containing fine ore in a fluidized bed operation by means of a reducing gas produced from natural gas. In this process the fine ore, which is rich in iron, is reduced by means of a reducing gas, at elevated pressure, in a system of fluidized bed reactors arranged in series. The sponge iron powder thus obtained is subsequently subjected to hot or cold briquetting. For further processing the sponge iron powder, separate melting facilities have to be provided.

From EP-A-0 217 331 it is known to directly prereduce fine ore in a fluidized bed operation and to feed the prereduced fine ore to a melter gasifier and to completely reduce it by means of a plasma burner under the supply of a carbon-containing reducing agent and to melt it. In the melter gasifier, a fluidized bed forms and thereabove a fluidized bed of coke. The prereduced fine ore or the sponge iron powder respectively are supplied to a plasma burner provided in a lower section of the melter gasifier. One disadvantage here is that by feeding the prereduced fine ore immediately in the lower melting region, i.e. in the region where the melt collects, complete reduction is no longer ensured and the chemical composition required for further processing of the pig iron cannot be achieved in any event. Moreover, charging of substantial amounts of prereduced fine ore is not feasible, due to the fluidized bed or fixed bed respectively forming from coal in the lower region of the melter gasifier, as it is not feasible to discharge a sufficient portion of the melting products from the high-temperature zone of the plasma burner. Charging of more substantial amounts of prereduced fine ore would instantly lead to thermal and mechanical failure of the plasma burner.

From EP-B-0 111 176 it is known to produce sponge iron particles and molten pig iron from lumpy iron ore, the iron ore being directly reduced in a direct-reduction aggregate and sponge iron particles discharged from the direct-reduction aggregate being fractionated into a coarse-and fine-grain fraction. The fine-grain fraction is supplied to a melter gasifier, in which the heat required for melting the sponge iron as well as the reducing gas supplied to the direct-reduction aggregate are produced from charged coal and supplied oxygen-containing gas. The fine-grain fraction is conducted into the melter gasifier via a downpipe projecting from the head of the melter gasifier as far as into the vicinity of the fluidized bed of coal. At the end of the downpipe a baffle plate is provided in order to minimize the velocity of the fine-grain fraction, and consequently the exit velocity of the fine-rain fraction on leaving the downpipe is very low. At the charging site, the temperature reigning inside the melter gasifier is very low, as a result of which immediate melting of the supplied fine-grain fraction cannot take place. This and the low exit velocity from the downpipe lead to a substantial portion of the supplied fine-grain fraction exiting from the melter gasifier along with the reducing gas produced in the same. In accordance with this process it is not possible to charge a more substantial amount of fine grain or to charge fine grain exclusively.

In a process according to EP-A-0 576 414 lumpy iron-ore-containing charging substances are directly reduced in a reduction shaft furnace, by means of the reducing gas formed in the melt-down gasifying zone. The sponge iron thus obtained is subsequently fed to the melt-down gasifying zone. In order to be able to additionally utilize fine ore and/or ore dust, such as oxidic iron fine dust incurring in a metallurgical plant, with this known process, the fine ore and/or the ore dust along with solid carbon carriers are supplied to a dust burner working into the melt-down gasifying zone and are reacted in a substoichiometric combustion reaction. A process of this kind enables efficient processing of fine ore and/or ore dust incurring in a metallurgical plant, and that up to an order of magnitude of 20 to 30% of the total ore charge, and thus enables a combined processing of lumpy ore and fine ore.

The invention aims at avoiding these drawbacks and difficulties and has as its object to provide a process of the initially described kind and a plant for carrying out the process enabling the processing of fine-particulate iron-containing material, without any need for briquetting, and wherein on the one hand any discharge of the supplied fine particles, i.e. of the iron-containing material, optionally in the prereduced or in the completely reduced state, by means of the reducing gas produced in the melter gasifier is reliably avoided and wherein on the other hand a possibly required complete reduction is ensured. One particular object of the invention is to create a process enabling the processing of a charge 100% of which are made up of fine-particulate iron-containing material to obtain pig iron and/or steel pre-products, while utilizing a melter gasifier.

In a process of the initially described kind this object is achieved in accordance with the invention in that a high-temperature combustion and/or gasification zone is formed by combusting and/or gasifying carbon-containing material under direct supply of oxygen in a killing space formed above the bed, into which high-temperature combustion and/or gasification zone the fine-particulate iron-containing material is directly introduced, wherein at least incipient surface melting of the iron-containing material and agglomeration of the same are carried out by means of the heat released during the reaction of the carbon-containing material.

The agglomerates thus formed exhibit a larger hydraulic diameter and/or a higher density and thus an enhanced velocity of descent. Thereby and also due to their enhanced form factor, i.e. the more favorable $C_w$-value resulting from extensive sphere formation, the iron-containing material is prevented from being discharged by the reducing gas discharged from the melter gasifier.

From EP-A-0 174 291 it is known to supply dustlike sulfidic nonferrous metal ores, particularly nonferrous metal ores, to a melter gasifier via a melter-burner. Even more substantial amounts of sulfidic nonferrous metal ores can be processed here, as the heat required for melting the ore particles is produced by exothermic reaction of the sulfidic ore with oxygen in the burner, f.i. in accordance with the following reaction:

$$CU_2S + 3/2O_2 = Cu_2O + SO_2$$

With this known process, the coal for forming a fluidized bed of carbon is charged into the melt-down gasifying zone separately. With a process of this kind it is not feasible to utilize more substantial amounts of oxidic fine ores, as the heat that would cause these oxidic fine ores to melt would not be available here. As a result, these ores would be discharged by the reducing gas which is formed in the melt-down gasifying zone and is discharged from the melter gasifier.

In order to achieve the most uniform and complete mixing and processing possible of the supplied solids, according to the invention the high-temperature combustion and/or gasification zone advantageously is formed centrally and on the upper end of the melter gasifier and the supply of said materials is effected in the downward direction, wherein suitably agglomeration is accelerated and intensified under swirling of the iron-containing material in the high-temperature combustion and/or gasification zone and further the supply of oxygen into the high-temperature combustion and/or gasification zone advantageously is likewise effected under swirling.

In accordance with a preferred embodiment the iron-containing material is introduced into the high-temperature combustion and/or gasification zone after having been mixed with solid fine-particle carbon-containing material, which particularly in hot-charging operations is only possible with fine-particle coke.

It is also advantageous if the speed of entry of the iron-containing material into the high-temperature combustion and/or gasification zone is increased by means of a propellant, such as nitrogen or in-process gas.

In accordance with a preferred embodiment reducing gas formed in the meltdown-gasifying zone is supplied to a preheating zone and/or a direct reduction zone for pretreating the iron-containing material, wherein the preheated and/or reduced iron-containing material is supplied to the high-temperature comnbustion and/or gasification zone in the hot state. Here, advantageously coke dust is additionally supplied to the preheating zone and/or direct reduction zone.

Another preferred embodiment is characterized in that fine coal and/or other carbon-containing materials having a volatile content along with oxygen-containing gas are introduced into the melter gasifier in the vicinity of the reducing-gas discharge duct, the fine coal and/or other carbon-containing materials having a volatile content are reacted to fine coke and the fine coke is discharged from the melter gasifier along with the reducing gas, is separated and is supplied to the high-temperature combustion and/or gasification zone. Other carbon-containing materials suitable for the process would f.i. be shredded plastics and fine-particle petroleum coke.

Here suitably the hot fine coke is supplied to the high-temperature combustion and/or gasification zone after having been mixed with hot iron-containing material.

If the fine coal and/or other carbon-containing materials having a volatile content are supplied to the high-temperature combustion and/or gasification zone, supply as far as the high-temperature combustion zone is effected separately from the iron-containing material, particularly if the latter has already undergone preheating, since contact of the coal with the hot sponge iron would lead to degassing and tar formation of the coal. This would lead to caking in the conveying ducts, which, in turn, would entail major operational difficulties.

To create the bed formed of solid carbon carriers, advantageously lumpy coal is additionally introduced into the meltdown gasifying zone.

A preferred variant is characterized in that in the preheating zone and/or direct reduction zone separation of the iron-containing material into a fine-grain fraction and a coarse-grain fraction is carried out, the latter preferably having particles of between 0,5 and 8 mm, and only the fine-grain fraction is introduced into the high-temperature combustion and/or gasification zone (27) and the coarse-grain fraction is directly introduced into the melter gasifier (1), preferably the killing space (III) of the same. Charging of the coarser fractions of the reduced iron ore can be effected by gravity alone. If fed into the high-temperature combustion and/or gasification zone, these would merely consume heat. Said heat is thus available to the fine particles for agglomeration. Thus the burner serving for the formation of the high-temperature combustion and/or gasification zone can work more effectively and optionally may be dimensioned on a smaller scale without adversely affecting agglomeration.

In another preferred embodiment the reducing gas is fed to the preheating zone and/or direct reduction zone without prior purification. Thereby carbon-containing dust from the melter gasifier can be separated and discharged in the preheating and/or direct reduction zone and supplied directly to the high-temperature combustion and/or gasification zone and be thermally exploited there.

A plant for carrying out the process, comprising a melter gasifier including supply and discharge ducts for adding carbon-containing material, iron-containing material, for discharging the reducing gas produced and for feeding oxygen-containing gas, as well as a slag and iron-melt tap, wherein a lower section of the melter gasifier is provided for collecting the molten pig iron or steel pre-material and the liquid slag, a superimposed central section is provided for accommodating a bed of solid carbon carriers and subsequently an upper section is provided as a killing space, characterized in that at least one burner supplying an oxygen-containing gas and fine-particulate iron-containing material and a supply means for supplying solid fine-particulate carbon carriers are provided on the upper end of the killing space, wherein advantageously a single burner arranged centrally, i.e., on the vertical longitudinal central axis of the melter gasifier, is provided, whose burner mouth is directed towards the surface of the bed.

Suitably the solid fine-particulate carbon carriers are also supplied via the burner, the burner advantageously being designed as an oxygen-carbon-burner.

To achieve thorough mixing of the solids supplied to the burner both with each other and with the supplied oxygen-containing gas, the burner advantageously is provided with a swirling means for the solids supplied via the burner and further the burner suitably is provided with a swirling means for the oxygen-containing gas fed via the burner.

A simple burner construction results if a mixed-stock duct for supplying the fine-particulate iron-containing material and the solid fine-particulate carbon carriers runs into the burner. This embodiment is particularly suited for charging fine particulate coke.

One preferred embodiment is characterized in that a duct supplying hot fine-particulate iron-containing material runs into the burner and said material is conducted as far as the burner mouth through a separate duct and that, furthermore a separate duct conducted as far as the burner mouth is provided within the burner, into which a duct supplying solid fine-particulate carbon carriers, such as coal, runs.

According to yet another preferred embodiment a reducing-gas discharge duct runs into a means for preheating and/or directly reducing the fine-particulate iron-containing material, departing from the killing space of the melter gasifier, wherein advantageously a dust separator is arranged intermediately in the reducing-gas discharge duct, from which a dust recycling duct is led to a dust burner arranged on the level of the killing space.

Moreover, here advantageously the means for preheating and/or direct reduction additionally serves to preheat coke dust mixed with fine-particulate iron-containing material and a mixed-stock duct departing from the preheating and/or prereduction means runs into the burner.

A further preferred embodiment is characterized in that the melter gasifier comprises a burner in the vicinity of the opening of the reducing-gas discharge duct, for supplying fine-particulate coal and/or other carbon-containing materials having a volatile content and that a dust separator is provided in the reducing-as discharge duct for separating fine-particulate coke discharged along with the reducing gas, a dust recycling duct departing from the dust separator running into a duct supplying fine-particulate iron-containing material to the burner and wherein suitably the reducing-gas discharge duct runs into a means for preheating and/or prereducing fine-particulate iron-containing material.

Suitably the means for preheating and/or direct reduction is provided with a fractionating means for separating the iron-containing material into a coarse- and a fine-grain fraction and the fine-grain fraction is conducted to the burner through the mixed-stock duct or the duct respectively, whereas the coarse-grain fraction is supplied to the melter gasifier directly, via a duct.

Advantageously the reducing-gas discharge duct runs into the preheating and/or direct-reduction means directly, i.e. with no dust separator arranged intermediately.

BRIEF DESCRIPTION OF THE DRAWING

FIG. 5 depicts a detail of FIG. 3 on an increased scale.

DESCRIPTION OF THE PREFERRED EMBODIMENTS

Figure 1:
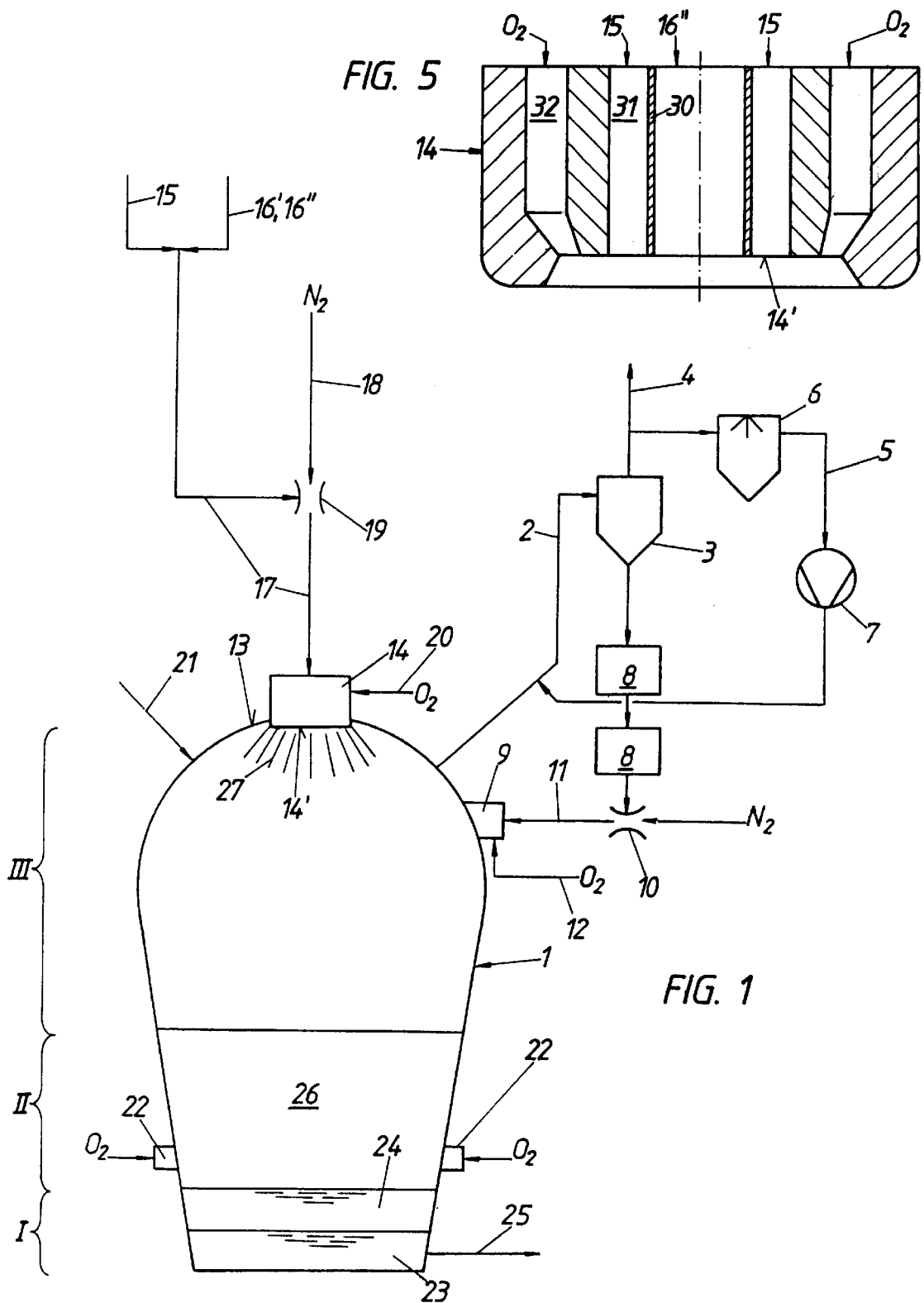
FIGS. 1 to 4 each illustrate a plant for carrying out the process, in schematic representation, in accordance with one embodiment each.

The reference numeral 1 designates a melter gasifier, in which a CO- and $H_2$-containing reducing gas is produced from coal and oxygen-containing gas. This reducing gas is discharged from the melter gasifier 1 via a reducing-gas discharge duct 2 opening into a gas purifying cyclone 3 and from the cyclone 3 is supplied to a consumer via an export gas duct 4. Part of the reducing gas discharged via the export gas duct 4 is recircled back into the reducing-gas discharge duct 2 by means of a return pipe 5 via a scrubber 6 and a compressor 7, in order to cool the reducing gas.

Via dust collecting vessel 8 the dust separated in the cyclone 3 is supplied to a dust burner 9 via the dust recycling duct 11 by means of a propellant (f.i. nitrogen) fed in via an injector 10 and in the dust burner 9 is combusted along with oxygen or oxygen-containing gas supplied via an oxygen supply duct 12.

The melter gasifier 1 at its upper end, i.e. at its head 13 or its hood, is provided with a centrally arranged burner 14 by means of which fine-particulate iron-containing material 15, such as, f.i., iron-containing dusts, particularly ore dusts, sponge iron dusts etc., and solid fine-particle carbon carriers, such as coke dusts 16', coal dusts 16", shredded plastics, petroleum coke etc., are charged to melter gasifier 1. In accordance with the embodiment depicted in FIG. 1 the fine-particle solid carbon carriers 16', 16" are mixed with the fine-particulate iron-containing material and through a mixed-stock duct 17 are supplied to the burner 14, wherein, in order to increase the speed of entry of the solids 15, 16', 16" supplied to the burner 14, a propellant duct 18 runs into the mixed-stock duct 17 via an injector 19. For example, nitrogen can be used as the propellant. Further, a duct 20 supplying an oxygen-containing gas opens into the burner 14.

The burner mouth 14' may, for example, also be constructed as described in EP-A-0 481 955, with the mixed-stock duct 17 opening into a central inner pipe of the burner 14 surrounded by an annular gap supplying the oxygen-containing gas. In principle, the fine-particle solid carbon carriers may also be conveyed to the burner mouth 14' via separate lances. Advantageously, the solids supplied to the burner 14 when leaving the burner 14 are twisted by means of the burner 14 by a twisting means (f.i. exit channels shaped like helical lines). In addition, twisting of the oxygen jet supplied through the annular space may also be effected, thereby achieving particularly efficient mixing.

Further, the melter gasifier 1 at its upper end 13 is provided with a feed duct 21 for lumpy carbon carriers, such as coal, as well as feed ducts 22 arranged further below for oxygen-containing gases as well as optionally feed ducts for carbon carriers, such as hydrocarbons, that are liquid or gaseous at room temperature and for burned fluxes.

In a lower section 1 of the melter gasifier 1, molten pig iron 23 or molten steel pre-products and molten slag 24 respectively collect, which are tapped off through a tap 25.

In a section II of the melter gasifier that is arranged above the lower section I a fixed bed and/or a fluidized bed 26 is formed of the solid carbon carriers. The feed ducts 22 for oxygen-containing gases open into this section II. An upper section III provided above the central section II serves as a killing space for the reducing gas forming in the melter gasifier 1 as well as for solid particles entrained by the as stream. The dust burner 9 that serves for recircling the dust opens into this upper section III.

At the burner mouth 14', there forms a high-temperature combustion and/or gasification zone 27 in which the fine particles of the iron-containing material 15 are melted under the formation of droplets or at least incipient surface-melting of the same is effected, as a result of which agglomeration of the iron-containing fine particles occurs. This effectively prevents the fine-particulate iron-containing material from being carried out along with the reducing gas discharged from the melter gasifier 1.

The droplet agglomerates forming exhibit a greater hydraulic diameter and/or a higher density and thus a higher rate of descent than the fine particles. Moreover, this rate of descent is still further enhanced due to the better form factor, i.e. the $C_w$-value of the droplet agglomerates forming.

By arranging the burner 14 in a central area at the head 13 of the melter gasifier 1 it becomes feasible to achieve a uniform mixing of the supplied solid particles and thus complete agglomeration. This results in an even integration of the iron carriers 15 into the fixed or fluid bed 26 respectively formed of solid carbon carriers in the melter gasifier 1. Hereby it becomes possible to realize the melting-reduction process while utilizing 100% fine ore and to avoid discharging of the iron carriers 15 from the melter gasifier 1 in the solid state.

Figure 2:
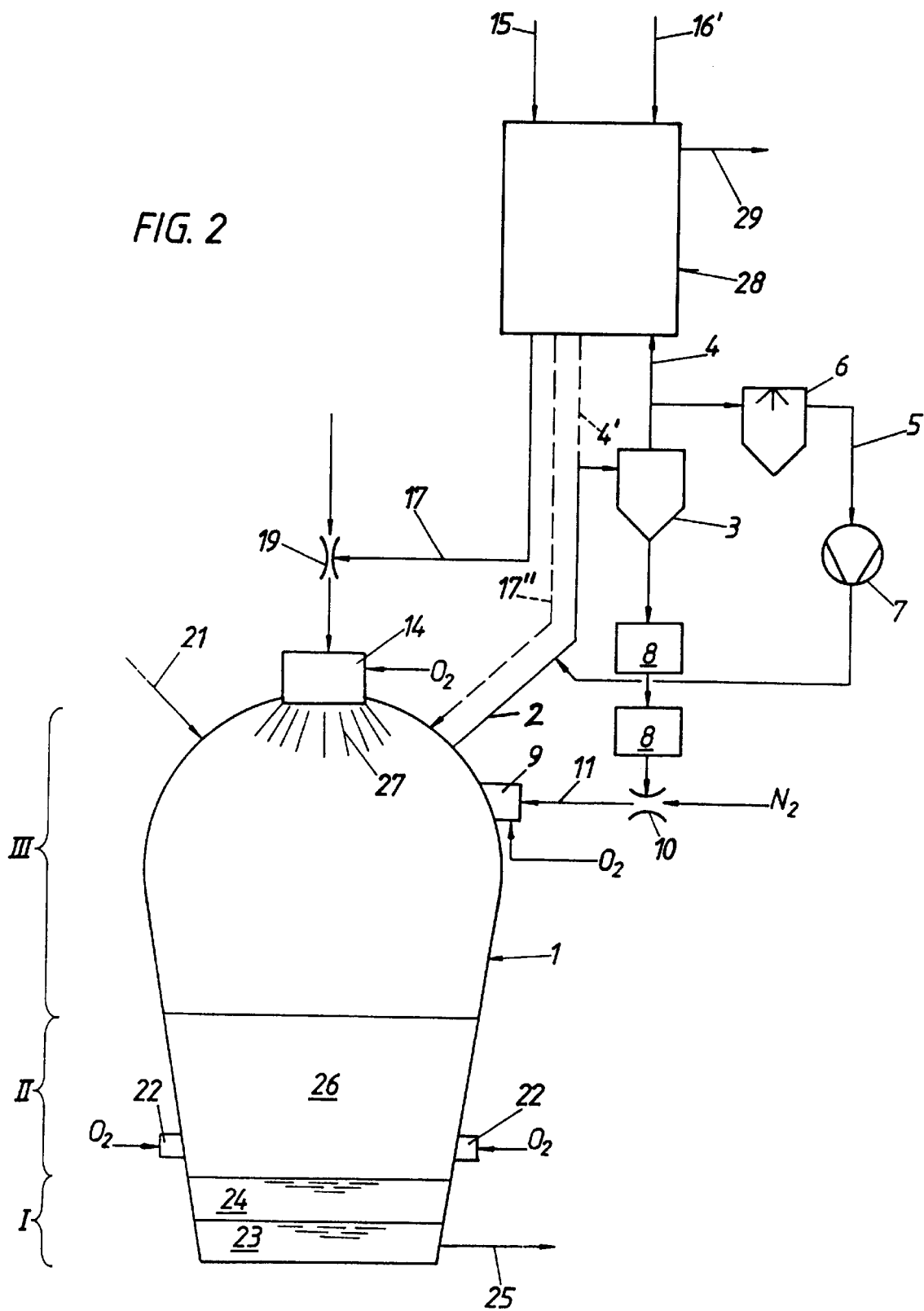

According to the embodiment illustrated in FIG. 2 the reducing gas is supplied to a preheating and/or prereduction and/or complete reduction reactor 28 via the export gas duct 4, into which reactor both coke dust 16' and fine-particulate iron-containing material 15, such as ore dust or sponge iron lust, are fed. After streaming through this reactor 28 in counterflow to the charged solid particles the possibly partially spent reducing gas is drawn off as an export gas via the duct 29. The preheated and optionally prereduced or even completely reduced solid material exiting from the reactor 28 at the lower end of the same reaches the burner 14 via the mixed-stock duct 17, the exit velocity being increased here, too, by means of a propellant, such as nitrogen, which is fed in through an injector 19. The grain size of the coke dust particles is so big that the rate of descent of the coke dust particles slightly exceeds the superficial velocity in reactor 28.

Advantageously the reactor 28 serving for preheating or reduction respectively is constructed as a shaft furnace. Instead of the shaft furnace 28 a rotary tubular kiln or a rotary kiln may be provided. Further, instead of a single reactor 28 several fluidized bed reactors consecutively arranged in series may be provided, wherein the fine ore is conducted from fluidized bed reactor to fluidized bed reactor via conveying ducts in counterflow to the reducing gas, in a manner similar to the one described in U.S. application Ser. No. 5,082,251.

Dust recirculation via 3, 8, 9,11, which is illustrated in FIG. 2, could be markedly reduced and optionally even be dropped altogether, since dust supplied to the reactor 28 via the duct 4' illustrated in broken lines (duct 4 may be left out in this case) is discharged from the reactor 28 again along with the preheated or optionally prereduced solids and is fed to the burner 14 and may be thermally exploited in the high-temperature zone 27. In this case, therefore, the cyclone 3 may be left out or else may be dimensioned for the recircled amount of reducing gas only (This is also true for the embodiment illustrated in FIGS. 3 and 4). Consequently, a reduced amount of dust is available for the dust burner 9 with the embodiments illustrated in FIGS. 2 and 3.

Figure 3:
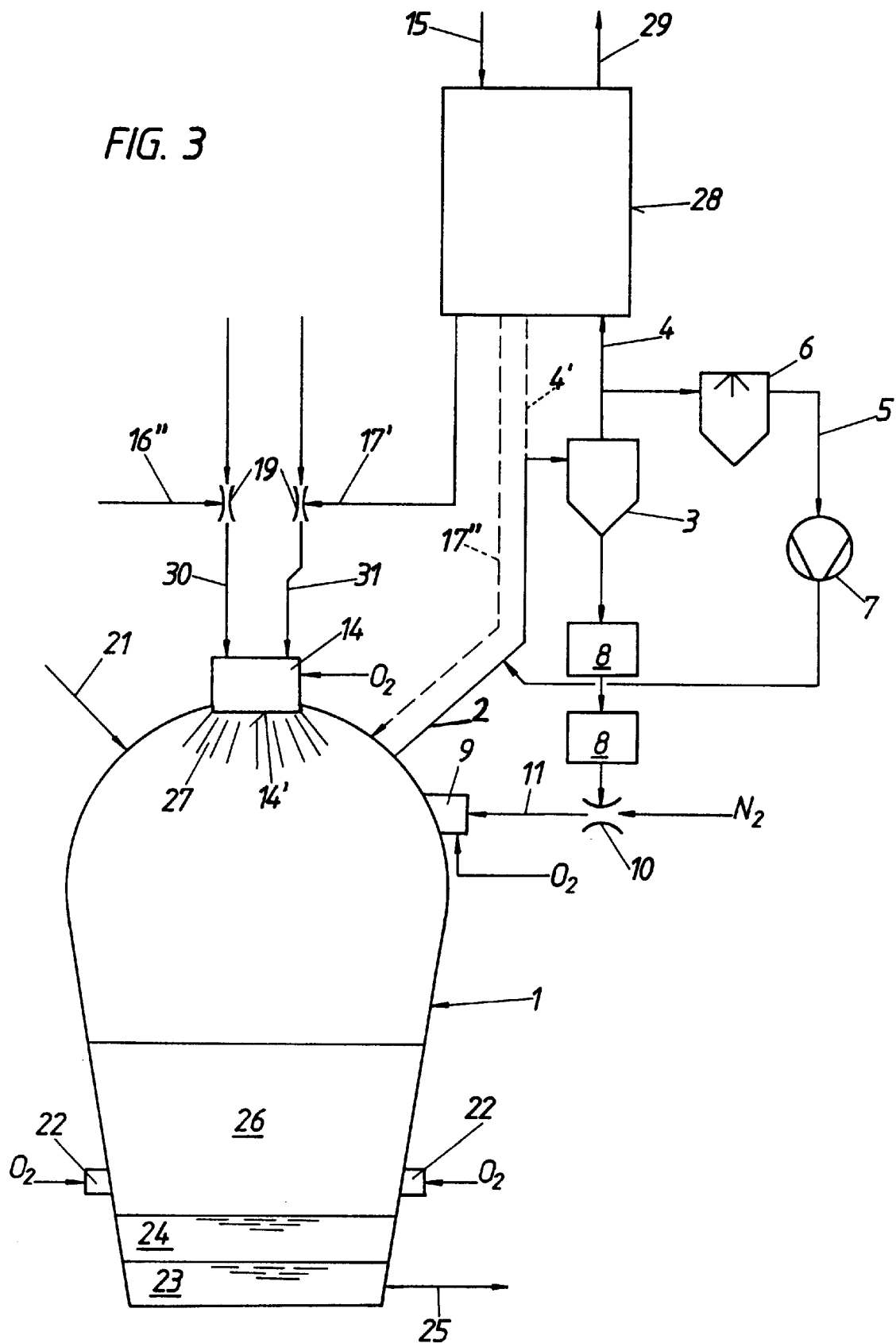

In accordance with the embodiment illustrated in FIG. 3, only fine-particulate iron-containing material 15 is fed to the reactor 28 through which the reducing gas streams. Fine coal 16" is supplied to the burner 14 as the solid carbon carrier, the fine coal 16" in this case being conducted as far as the burner mouth 14' separately from the preheated or prereduced material originating from the reactor 28 and supplied via the duct 17', to prevent degassing and tar formation of the coal.

FIG. 5 depicts a burner 14 which could be utilized in this case. Through a central pipe 30 of the burner 14 the fine coal 16" is supplied and through an annular gap 31 surrounding the central pipe 30 preheated sponge iron or preheated fine ore 15 respectively are supplied separately from the fine coal 16". This annular gap 31 is surrounded by a further annular gap 32 for feeding an oxygen-containing gas.

Figure 4:
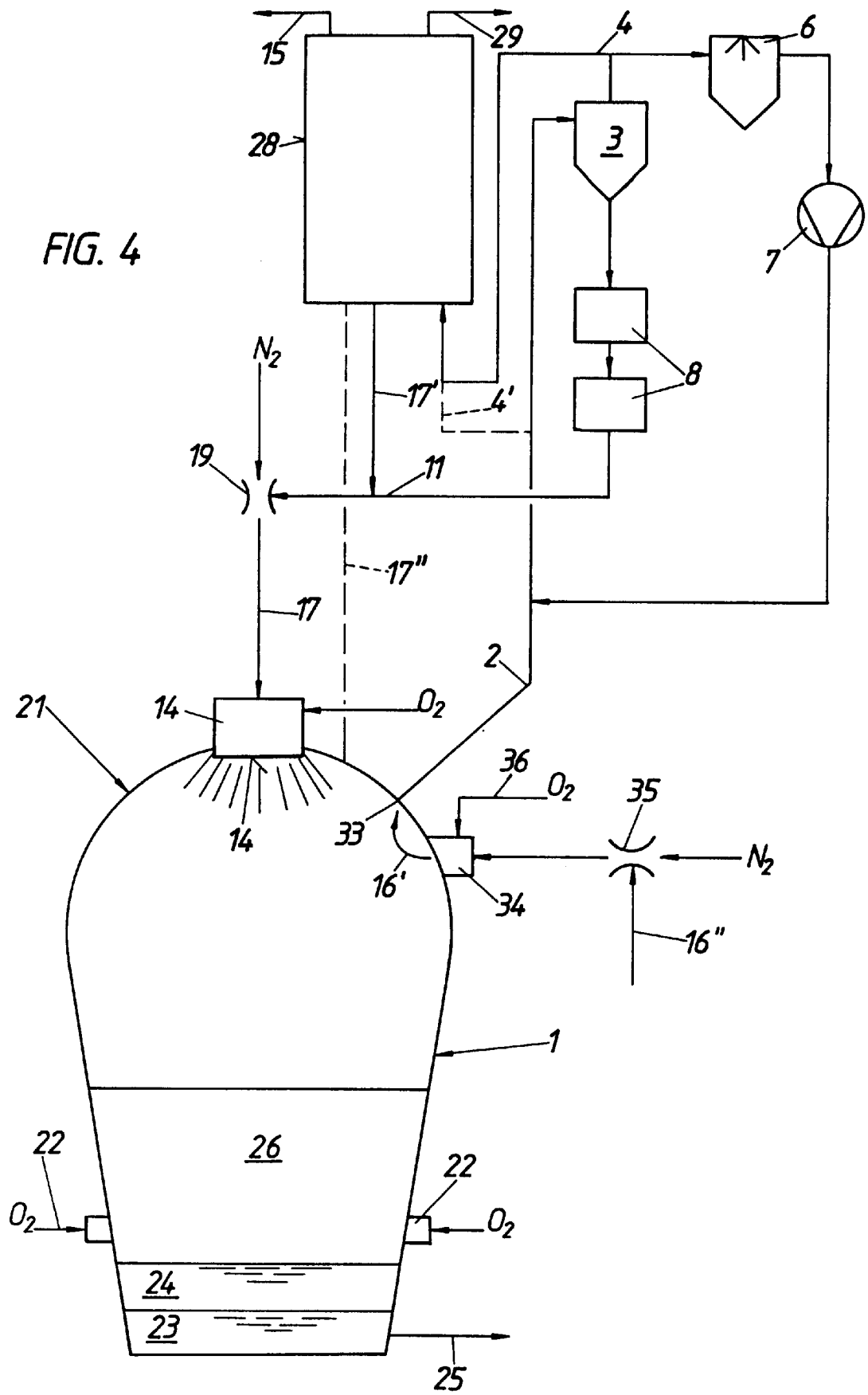

In accordance with the embodiment illustrated in FIG. 4 a burner 34 for supplying fine-particulate coal 16" opens into the melter gasifier 1 in the vicinity of the opening 33 of the reducing-gas discharge duct 2. This fine-particulate coal 16" is fed to the burner 34 by means of a propellant, such as nitrogen, which is supplied via an injector. A duct 36 supplying an oxygen-containing gas runs into the burner 34. Instead of or in addition to fine-particulate coal 16", other carbon-containing material having a volatile content may also be charged, such as shredded plastics, petroleum coke etc.

Reaction—partial combustion—of the supplied fine coal 16" to coke dust 16' takes place. The latter is discharged almost completely along with the reducing gas, due to the burner 34 being arranged in the vicinity of the opening 33 of the reducing-gas discharge duct 2, and is separated in the cyclone 3 into which the reducing-gas discharge duct 2 runs. Via a dust recycling duct 11 the coke dust 16' is mixed with fine particulate iron-containing material 15 that has been preheated or prereduced in reactor 28 and by means of a propellant, such as nitrogen, is fed to the burner 16 via a mixed-stock duct 17.

With embodiments according to FIGS. 2 to 4 the reactor 28 could be provided with a fractionating device, the coarse-rained fraction (particles ranging between 0.5 and 8 mm) being fed to the melter gasifier 1 directly, via a duct 17", f.i. by gravity charging, and the fine particles being fed to the high-temperature combustion and/or gasification zone 27. Thereby, load is taken off the burner 14, so that its heat will be exclusively available to fines particles, which have to be agglomerated by all means, in order to prevent discharging.

The grain size of the fine ore utilized with the process according to the invention is preferably in the range of 8 to 0 mm.

EXAMPLE I

For the production of 40 ton pig iron/h in a plant according to FIG. 1 1,970 kg coal/ton PI (pig iron), namely 250 kg fine coal/ton PI (16") and the balance in the form of lumpy coal (at 21), as well as 1,134 kg fine-particulate iron-containing material 15/ton PI are charged to the melter gasifier.

Coal chemical analysis of the coal (fine coal 16" and lumpy coal, weight percent, dry basis)

| | |
|---|---|
| C | 81.4% |
| H | 4.3% |
| N | 1.7% |
| O | 2.9% |
| S | 0.7% |
| ashes | 9.0% |
| C-fix | 75.3% | grain size distribution of the fine coal 16"

| | |
|---|---|
| 500 μm | 100% |
| 250 μm | 85% |
| 100 μm | 51% |
| 63 μm | 66% |
| 25 μm | 21% |

Fine-particulate iron-containing material 15 (recyclings from a metallurgical plant): chemical analysis (weight percent):

| | |
|---|---|
| $Fe_{tot}$ | 86.6% |
| $Fe_{met}$ | 45.0% |
| $Fe_O$ | 49.0% |
| $Fe_2O_3$ | 5.0% |
| loss at red heat | 0.2% |
| moisture | 1.0% | grain size distribution

| | |
|---|---|
| 250 μm | 100% |
| 100 μm | 90% |
| 63 μm | 71% |
| 25 μm | 38% |
| 10 μm | 15% |

Fluxes
chemical analysis (weight percent):

| | |
|---|---|
| CaO | 34.2% |
| MgO | 6.0% |
| $SiO_2$ | 22.0% |
| $Al_2O_3$ | 0.3% |
| $Fe_2O_3$ | 2.1% |
| MnO | 0.2% |
| loss at red heat | 33.8% |

Via the feed ducts 22 constructed as blowing molds 347 $Nm^3O_2$/ton PI for gasifying the coal are introduced into the bed 26, consumption of the burner 14 amounts to 247 $Nm^3O_2$/ton PI.

Pig iron 23
chemical analysis (weight percent):

| | |
|---|---|
| C | 4.3% |
| Si | 0.4% |
| Mn | 0.05% |
| P | 0.03% |
| S | 0.05% |
| Fe | 95.1% |

Export gas
amount: 1,640 $Nm^3$/ton PI
analysis (volume percent):

| | |
|---|---|
| CO | 73.3% |
| $CO_2$ | 6.4% |
| $H_2$ | 14.3% |
| $H_2O$ | 2% |
| $N_2$ + Ar | 2.9% |
| $CH_4$ | 1.1% | calorific value: 11,200 $kJ/Nm^3$

EXAMPLE II

For the production of 40 ton pig iron/h in a plant according to FIG. 2, 758 kg lumpy coal/ton PI (at 21) are charged to the melter gasifier 1 and 222 kg coke dust/ton PI 16' as well as 1,457 kg fine-particulate iron-containing material 15/ton PI to the reactor 28.

Lumpy coal
chemical analysis of the coal (weight percent, dry basis)

| | |
|---|---|
| C | 81.4% |
| H | 4.3% |
| N | 1.7% |
| O | 2.9% |
| S | 0.7% |
| ashes | 9.0% |
| C-fix | 75.3% |

Coke dust 16'
chemical analysis (weight percent, dry basis)

| | |
|---|---|
| C | 87.4% |
| H | 0.1% |
| N | 0.1% |
| O | 0.4% |
| S | 0.6% |
| ashes | 11.4% |
| C-fix | 0.9% | grain size distribution of the coke dust 16'

| | |
|---|---|
| 500 μm | 100% |
| 250 μm | 85% |
| 100 μm | 51% |
| 63 μm | 66% |
| 25 μm | 21% |

Fine-particulate iron-containing material 15
chemical analysis (weight percent):

| | |
|---|---|
| $Fe_{tot}$ | 66.3% |
| $Fe_O$ | 0.4% |
| $Fe_2O_3$ | 94.5% |
| loss at red heat | 1.0% |
| moisture | 1.0% | grain size distribution

| | |
|---|---|
| 4000 μm | 100% |
| 1000 μm | 97% |
| 500 μm | 89% |
| 250 μm | 66% |
| 125 μm | 25% |

Fluxes
chemical analysis (weight percent):

| | |
|---|---|
| CaO | 34.2% |
| MgO | 9.9% |
| $SiO_2$ | 14.1% |
| $Al_2O_3$ | 0.3% |
| $Fe_2O_3$ | 1.1% |
| MnO | 0.5% |
| loss at red heat | 39.1% |

Via the feed ducts 22 constructed as blowing molds, 416 $Nm^3O_2$/ton PI for gasifying the coal are introduced into bed 26, consumption of the burner 14 amounts to 236 $Nm^3O_2$/ton PI.

Pig iron 23
chemical analysis (weight percent):

| | |
|---|---|
| C | 4.3% |
| Si | 0.4% |
| Mn | 0.1% |
| P | 0.12% |
| S | 0.05% |
| Fe | 95.0% |

Export gas
amount: 1,690 N mM$^3$/ton PI
analysis (volume percent):

| | |
|---|---|
| CO | 44.8% |
| CO$_2$ | 36.2% |
| H$_2$ | 12.8% |
| H$_2$O | 2% |
| N$_2$ + Ar | 3.0% |
| CH$_4$ | 1.0% | calorific value: 7,425 kJ/Nm$^3$

Example III:

For the production of 40 ton pig iron/h in a plant according to FIG. 4 1,020 kg coal/ton PI, namely 340 kg fine coal/ton PI 16" and the balance in the form of lumpy coal (at 21) as well as 1,460 kg fine-particulate iron-containing material/ton PI are charged.

Coal
chemical analysis of the coal (fine coal 16" and lumpy coal, weight percent, dry basis)

| | |
|---|---|
| C | 77.2% |
| H | 4.6% |
| N | 1.8% |
| O | 6.8% |
| S | 0.5% |
| ashes | 9.0% |
| C-fix | 63.0% | grain size distribution of the fine coal 16"

| | |
|---|---|
| 500 μm | 100% |
| 250 μm | 85% |
| 100 μm | 51% |
| 63 μm | 66% |
| 25 μm | 21% |

Fine-particulate iron-containing material 15
chemical analysis (weight percent):

| | |
|---|---|
| Fe$_{tot}$ | 66.3% |
| Fe$_O$ | 0.4% |
| Fe$_2$O$_3$ | 94.5% |
| loss at red heat | 1.0% |
| moisture | 1.0% | grain size distribution

| | |
|---|---|
| 4000 μm | 100% |
| 1000 μm | 97% |
| 500 μm | 89% |
| 250 μm | 66% |
| 125 μm | 25% |

Fluxes
chemical analysis (weight percent):

| | |
|---|---|
| CaO | 34.2% |
| MgO | 9.9% |
| SiO$_2$ | 14.1% |
| Al$_2$O$_3$ | 0.3% |
| Fe$_2$O$_3$ | 1.1% |
| MnO | 0.5% |
| loss at red heat | 39.1% |

Through the feed ducts 22, which are constructed as blowing molds, 321 Nm$^3$O$_2$/ton PI for gasifying the coal are introduced into the bed 26, the burner 14 consumes 255 Nm$^3$O$_2$/ton PI and the burner 34 consumes 75 Nm$^3$O$_2$/on PI.

Pig iron 23
chemical analysis (weight percent):

| | |
|---|---|
| C | 4.3% |
| Si | 0.4% |
| Mn | 0.09% |
| P | 0.1% |
| S | 0.05% |
| Fe | 95.0% |

Export gas
amount: 1,720 Nm$^3$/ton PI
analysis (volume percent):

| | |
|---|---|
| CO | 38.7% |
| CO$_2$ | 37.2% |
| H$_2$ | 16.4% |
| H$_2$O | 2% |
| N$_2$ + Ar | 4.6% |
| CH$_4$ | 1.1% | calorific value: 7,060 kJ/Nm$^3$

We claim:

1. A process for the production of molten pig iron (23) or steel pre-products from fine-particulate iron-containing material (15) in a meltdown gasifying zone of a melter gasifier (1), in which, under the supply of carbon-containing material and oxygen-containing gas at the simultaneous formation of a reducing gas, in a bed (26) formed of solid carbon carriers, the iron-containing material (15) is melted when passing the bed (26), optionally upon previous complete reduction, comprising forming a high-temperature combustion and/or gasification zone (27) by combusting and/or gasifying carbon-containing material (16', 16") under direct supply of oxygen in a killing space (III) formed above the bed (26), into which high-temperature combustion and/or gasification zone the fine-particulate iron-containing material (15) is directly introduced, wherein at least incipient surface melting of the iron-containing material (15) and agglomeration of the same are carried out by means of the heat released during the reaction of the carbon-containing material (16', 16").

2. A process according to claim 1, characterized in that the high-temperature combustion and/or gasification zone (27) is formed centrally and on the upper end (13) of the melter gasifier (1) and the supply of said materials (15, 16', 16") is effected in the downward direction.

3. A process according to claim 1, characterized in that agglomeration is accelerated and intensified under swirling of the iron-containing material (15) in the high-temperature combustion and/or gasification zone (27).

4. A process according to claim 3, characterized in that the supply of oxygen into the high-temperature combustion and/or gasification zone (27) likewise is effected under swirling.

5. A process according to claims 1, characterized in that the iron-containing material (15) is introduced into the high-temperature combustion and/or gasification zone (27) after having been mixed with solid fine-particle carbon-containing material (16', 16").

6. A process according to claim 1, characterized in that the speed of entry of the iron-containing material (15) into the high-temperature combustion and/or gasification zone (27) is increased by means of a propellant.

7. A process according to claim 1, characterized in that reducing gas formed in the meltdown gasifying zone is supplied to a preheating zone and/or a direct reduction zone for pretreating the iron-containing material, wherein the preheated and/or prereduced iron-containing material (15) is supplied to the high-temperature combustion and/or gasification zone (27) in the hot state (FIGS. 2, 3, 4).

8. A process according to claim 7, characterized in that coke dust (16') is additionally supplied to the preheating zone and/or direct reduction zone (FIG. 2).

9. A process according to claim 8, characterized in that fine coal (16") and/or other carbon-containing materials having a volatile content along with oxygen-containing gas are introduced into the melter gasifier (1) in the vicinity of the reducing-gas discharge duct (2), the fine coal (16") and/or other carbon-containing materials having a volatile content is (are) reacted to fine coke (16') and the fine coke (16') is discharged from the melter gasifier (1) along with the reducing gas, is separated and is supplied to the high-temperature combustion and/or gasification zone (27) (FIG. 4).

10. A process according to claim 1, characterized in that hot fine coke (16') is supplied to the high-temperature combustion and/or gasification zone after having been mixed with hot iron-containing material (15) (FIGS. 2, 4).

11. A process according to claim 1, characterized in that fine coal (16") and/or other carbon-containing materials having a volatile content is supplied to the high-temperature combustion and/or gasification zone (27) separately from the iron-containing material (15) (FIG. 3).

12. A process according to claim 1, characterized in that lumpy coal is additionally introduced into the meltdown-gasifying zone.

13. A process according to claim 7, characterized in that in the preheating zone and/or direct reduction zone separation of the iron-containing material into a fine-grain fraction and a coarse-grain fraction is carried out, the latter preferably having particles of between 0.5 and 8 mm, and the only fine-grain fraction is introduced into the high-temperature combustion and/or gasification zone (27) and the coarse-grain fraction is directly introduced into the melter gasifier (1).

14. A process according to claim 7, characterized in that the reducing gas is fed to the preheating zone and/or direct reduction zone unpurified.

15. A plant for the production of pig iron comprising a melter gasifier (1) including supply and discharge ducts (2, 12, 20, 17, 30, 31) for adding carbon-containing material (16', 16"), iron-containing material (15), for discharging the reducing gas produced and for feeding oxygen-containing gas, as well as a slag and iron-melt tap (25), wherein a lower section (1) of the melter gasifier (1) is provided for collecting the molten pig iron (23) or steel pre-material and the liquid slag (24), a superimposed central section (II) is provided for accommodating a bed (26) of solid carbon carriers and subsequently an upper section (III) is provided as a killing space, characterized in that at least one burner (14) supplying an oxygen-containing gas and fine-particulate iron-containing material (15) and a supply means (14) for supplying solid fine-particulate carbon carriers (16', 16") are provided on the upper end (13) of the killing space (III).

16. A plant according to claim 15, characterized in that a single burner (14) arranged on the vertical longitudinal central axis of the melter gasifier (1), is provided, whose burner mouth (14') is directed towards the surface of the bed (26).

17. A plant according to claim 15, characterized in that the burner (14) is designed as an oxygen-carbon-burner so as to serve also the supply of the solid fine-particulate carbon carriers (16', 16").

18. A plant according to claim 15, characterized in that the burner (14) is provided with a swirling means for the solids supplied via the burner (14).

19. A plant according to claim 15, characterized in that the burner (14) is provided with a swirling means for the oxygen-containing gas fed via the burner (14).

20. A plant according to claim 15, characterized in that a mixed-stock duct (17) for supplying the fine-particulate iron-containing material (15) and the solid fine-particulate carbon carriers (16', 16") runs into the burner (FIGS. 1, 2, 4).

21. A plant according to claim 15, characterized in that a duct (17') supplying hot fine-particulate iron-containing material (15) runs into the burner (14) and said material is conducted as far as the burner mouth (14') through a separate duct (31) and that, furthermore, a separate duct (30) conducted as far as the burner mouth (14') is provided within the burner (14), into which a duct supplying solid fine-particulate carbon carriers, such as coal (16"), runs (FIGS. 3, 5).

22. A plant according to claim 15, characterized in that a reducing-gas discharge duct (2) runs into a means (28) for preheating and/or directly reducing the fine-particulate iron-containing material (15), departing from the killing space (III) of the melter gasifier (1) (FIGS. 2, 3, 4).

23. A plant according to claim 22, characterized in that a dust separator (3) is arranged intermediately in the reducing-gas discharge duct (2), from which a dust recycling duct (11) is led to a dust burner (9) arranged on the level of the killing space (III).

24. A plant according to claim 22, characterized in that the means (28) for preheating and/or direct reduction additionally serves to preheat coke dust (16') mixed with fine-particular iron-containing material (15) and a mixed-stock duct (17) departing from the preheating and/or prereduction means (28) runs into the burner (FIG. 2).

25. A plant according to claim 15, characterized in that the melter gasifier (1) comprises a burner (34) in the vicinity of the opening (33) of the reducing-gas discharge duct (2), for supplying fine-particulate coal (16") and/or other carbon-containing materials having a volatile content and that a dust separator (3) is provided in the reducing-gas discharge duct (2) for separating fine-particulate coke (16') discharged along with the reducing gas, a dust recycling duct (11) departing from the dust separator (3) running into a duct supplying fine-particulate iron-containing material to the burner (FIG. 4).

26. A plant according to claim 22, characterized in that the means (28) for preheating and/or direct reduction is provided with a fractionating means for separating the iron-containing material into a coarse- and a fine-grain fraction and the fine-grain fraction is conducted to the burner (14) through the mixed-stock duct (17) or the duct (17') respectively, whereas the coarse-grain fraction is supplied to the melter gasifier (1) directly, via a duct (17").

27. A plant according to claim 22, characterized in that the reducing-gas discharge duct (2) runs into the preheating and/or direct-reduction means (28) directly with no dust separator (3) arranged intermediately.

28. A process according to claim 13, wherein the coarse-grain fraction is introduced into the killing space (III) of the melter gasifier.

29. A process according to claim 6, wherein the propellant is nitrogen or in-process gas.

* * * * *